(12) United States Patent
Nishimoto et al.

(10) Patent No.: US 9,994,155 B2
(45) Date of Patent: Jun. 12, 2018

(54) VEHICLE SIDE-VIEW MIRROR

(71) Applicants: ISHIZAKI HONTEN CO., LTD., Hiroshima-shi, Hiroshima (JP); HONDA MOTOR CO., LTD., Tokyo (JP)

(72) Inventors: Teiji Nishimoto, Hiroshima (JP); Hiroaki Ohtagaki, Hiroshima (JP); Tomoya Morimura, Hiroshima (JP); Kazuaki Hiwatashi, Saitama (JP); Takafumi Usui, Tochigi (JP)

(73) Assignees: ISHIZAKI HONTEN CO., LTD., Hiroshima (JP); HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/446,613

(22) Filed: Mar. 1, 2017

(65) Prior Publication Data

US 2017/0253184 A1 Sep. 7, 2017

(30) Foreign Application Priority Data

Mar. 3, 2016 (JP) .................................. 2016-041254

(51) Int. Cl.
*B60R 1/06* (2006.01)
*B60R 1/12* (2006.01)

(52) U.S. Cl.
CPC .............. *B60R 1/06* (2013.01); *B60R 1/1207* (2013.01); *B60Y 2306/09* (2013.01)

(58) Field of Classification Search
CPC ..... B60R 1/06; B60R 1/1207; B60Y 2306/09; G02B 7/198

USPC ................. 359/841, 844, 872–874; 296/1.11
See application file for complete search history.

(56) References Cited

U.S. PATENT DOCUMENTS

| 8,029,150 | B2 * | 10/2011 | Okamoto | B60R 1/06 359/841 |
| 8,550,641 | B2 * | 10/2013 | Iseki | B60R 1/078 359/841 |
| 8,939,590 | B2 * | 1/2015 | Sawada | B60R 1/062 359/844 |
| 2004/0129853 | A1 * | 7/2004 | Suzuki | B60Q 1/2665 248/475.1 |
| 2009/0244744 | A1 | 10/2009 | Okamoto et al. | |

(Continued)

FOREIGN PATENT DOCUMENTS

| JP | 2007076461 A | * | 3/2007 | ............... B60R 1/06 |
| JP | 2009-241618 A | | 10/2009 | |

(Continued)

*Primary Examiner* — Frank Font
(74) *Attorney, Agent, or Firm* — Renner, Otto, Boisselle & Sklar, LLP

(57) ABSTRACT

A sleeve 15 is formed on a mirror base 10. An opening 28a is formed in a mirror head 20. The sleeve 15 has an outer peripheral surface including a first outer peripheral surface 15a and a second outer peripheral surface 15b. The second outer peripheral surface 15b is located further in an inward radial direction of the sleeve 15 than the first outer peripheral surface 15a. The second outer peripheral surface 15b is formed so as to extend smoothly in a circumferential direction of the sleeve. A passage 40, which guides wind entering the mirror head 20, is formed between the second outer peripheral surface 15b and an inner peripheral surface of the opening 28a.

10 Claims, 6 Drawing Sheets

(56) References Cited

U.S. PATENT DOCUMENTS

2012/0154940 A1   6/2012  Kawanishi et al.
2016/0102702 A1*  4/2016  Lang ................... E05D 11/1078
                                                               248/479

FOREIGN PATENT DOCUMENTS

JP         2012-131238 A      7/2012
JP          2012236534 A  * 12/2012  ............... B60R 1/06

* cited by examiner

VEHICLE SIDE-VIEW MIRROR

CROSS-REFERENCE TO RELATED APPLICATION

This application claims priority to Japanese Patent Application No. 2016-041254 filed on Mar. 3, 2016, the entire disclosure of which is incorporated by reference herein.

BACKGROUND

The present disclosure relates to a vehicle side-view mirror, which is provided at a side of, for example, a car, and particularly relates to the technical field of configurations which reduce wind noise.

In general, a vehicle side-view mirror includes a mirror base fixed to a vehicle body, for example to a door, and a mirror head attached to the mirror base. The mirror head being rotatable with respect to the mirror base, the mirror is movable between a folded position and an operative position (see, for example, Japanese Unexamined Patent Publications No. 2009-241618 and No. 2012-131238).

The mirror base of the vehicle side-view mirror disclosed in Japanese Unexamined Patent Publication No. 2009-241618 is provided with a shaft which protrudes upward. The shaft is inserted into the mirror head and the mirror head becomes rotatable about the shaft. The shaft has a lower end, on an outer peripheral surface of which vertically extending ribs, which are spaced apart from each other in a circumferential direction, are formed. Further, it is disclosed that vertically extending grooves, which are spaced apart from each other in the circumferential direction, are formed on the outer peripheral surface of the lower end of the shaft. Japanese Unexamined Patent Publication No. 2009-241618 discloses that, when headwind, which has entered a space between the mirror base and the mirror head, strikes the ribs and grooves, pressure fluctuations can be balanced and noise can be reduced.

Moreover, in the vehicle side-view mirror of Japanese Unexamined Patent Publication No. 2012-131238, the shaft of the mirror base is inserted into an opening formed in the mirror head. The portion of the shaft inserted into the opening has an outer peripheral surface on which vertically extending ribs, which are spaced apart from each other in the circumferential direction, are formed.

SUMMARY

In Japanese Unexamined Patent Publications No. 2009-241618 and No. 2012-131238, a plurality of ribs and grooves is formed on the outer peripheral surface of the shaft. However, as also described in Japanese Unexamined Patent Publication No. 2012-131238, this results in turbulences which, due to factors such as wind velocity, may cause wind noise.

Further, in a structure where the mirror base and the mirror head are separate parts, it cannot be avoided that a gap is formed between the mirror base and the mirror head. Since not only headwind but also crosswind flows into this gap, such a structure is prone to produce wind noise.

Yet another conceivable cause of wind noise is the interaction of wind with, for instance, parts inside a mirror housing (wind noise produced on edges). However, Japanese Unexamined Patent Publications No. 2009-241618 and No. 2012-131238 do not take this aspect into consideration.

In view of the foregoing, it is therefore an object of the present disclosure to reduce causes of wind noise in a vehicle side-view mirror.

In order to accomplish the above object, the present disclosure attempts to reduce wind noise in a vehicle side-view mirror.

A first aspect of the present disclosure relates to a vehicle side-view mirror including:

a mirror base, which is fixed to a vehicle body; and a mirror head, which includes a mirror surface, is attached to the mirror base to be rotatable about an axis vertically extending with respect to the mirror base, and is switchable between a folded position and an operative position, wherein a gap is formed between the mirror base and the mirror head, a sleeve, which protrudes upward, is formed on the mirror base, an opening, into which the sleeve is inserted, is formed on a bottom of the mirror head, the sleeve has an outer peripheral surface on which a first outer peripheral surface and a second outer peripheral surface, which is located further in an inward radial direction of the sleeve than the first outer peripheral surface, are formed in a circumferential direction, the second outer peripheral surface is formed so as to extend smoothly in the circumferential direction of the sleeve, and a passage, which guides wind entering the gap into the mirror head, is formed between the second outer peripheral surface and an inner peripheral surface of the opening.

According to this configuration, when the mirror head is fixed to the mirror base, the sleeve of the mirror base is inserted into the opening. Since in this state the second outer peripheral surface of the sleeve is located further in the inward radial direction than the first outer peripheral surface, a passage of a sufficiently large cross-section is formed between the second outer peripheral surface and the inner peripheral surface of the opening. Wind entering the space between the mirror base and the mirror head is guided via the passage into the mirror head. This makes turbulences less likely to form in the gap, and reduces the amount of wind noise leaking outside. Moreover, since the second outer peripheral surface, which is a part of the passage, extends smoothly, in this structure turbulences become less likely to form than in the structure known in the art where ribs and grooves are formed. This structure also reduces wind noise.

A second aspect of the present disclosure relates to a vehicle side-view mirror including:

a mirror base, which is fixed to a vehicle body; and a mirror head, which includes a mirror surface, is attached to the mirror base to be rotatable about an axis vertically extending with respect to the mirror base, and is switchable between a folded position and an operative position, wherein a gap is formed between the mirror base and the mirror head, a sleeve, which protrudes upward, is formed on the mirror base, an opening, into which the sleeve is inserted, is formed in a bottom of the mirror head, the sleeve has an outer peripheral surface on which a first outer peripheral surface and a second outer peripheral surface, which is located further in an inward radial direction of the sleeve than the first outer peripheral surface, are formed in a circumferential direction, the first outer peripheral surface is provided inside the vehicle to continuously extend from a front edge of the sleeve at a front of the vehicle along a rear edge of the sleeve at a rear of the vehicle, the second outer peripheral surface is provided only on a portion of the outer peripheral surface of the sleeve outside the vehicle, and the portion of the peripheral surface of the sleeve outside the vehicle has a shorter perimeter than the portion of the peripheral surface of the sleeve inside the vehicle.

According to this configuration, at the front edge of the sleeve, headwind flowing from the front of the vehicle is divided into two wind flows. One wind flow flows along the peripheral surface of the sleeve inside the vehicle and the other wind flow flows along the peripheral surface of the sleeve outside the vehicle. At the rear edge of the sleeve, these wind flows merge again and flow toward the rear of the vehicle.

Here, the two wind flows have the same wind speed at the front edge and at the rear edge of the sleeve. Between the front edge and the rear edge, however, the wind flow flowing along the peripheral surface of the sleeve outside the vehicle, which has a shorter perimeter, has a relatively lower wind speed than the wind flow flowing along the peripheral surface of the sleeve inside the vehicle, which has a longer perimeter. Consequently, the peripheral surfaces of the sleeve inside and outside the vehicle have different perimeters so that the wind speed of the wind flow flowing along the peripheral surface of the sleeve outside the vehicle can be effectively reduced.

In another aspect of the present disclosure, the outer peripheral surface of the sleeve may have a vertical surface, which extends in a radial direction of the sleeve at a border between the first outer peripheral surface and the second outer peripheral surface.

According to this configuration, the vertical surface guides wind, which flows into the gap between the mirror base and the mirror head, also in a radially outward direction. This divides the wind into a wind flow flowing into the mirror head and a wind flow flowing in a radial direction of the sleeve.

In still another aspect of the present disclosure, a portion of the sleeve the second outer peripheral surface is formed on may be thinner than a portion of the sleeve the first outer peripheral surface is formed on.

According to this configuration, the second outer peripheral surface is located further in the inward radial direction than the first outer peripheral surface. Forming the second outer peripheral surface allows for forming a part of the sleeve thin and thus for achieving weight saving.

In yet still another aspect of the present disclosure, a protrusion, which protrudes upward, may be provided on a portion of a top of the sleeve in the circumferential direction, the mirror head may be provided with a stopper, which abuts against the protrusion from the circumferential direction when the mirror head is rotated, the stopper setting a range of rotation of the mirror head, and the second outer peripheral surface may be formed at a distance in the circumferential direction with respect to the portion of the sleeve the protrusion is formed on.

According to this configuration, when the mirror head is rotated, the stopper of the mirror head abuts against the protrusion of the mirror base from the circumferential direction. This allows to predetermine the range of rotation of the mirror head. Since the protrusion is then at a distance from the second outer peripheral surface in the circumferential direction, the portion the protrusion is formed on is separated from the thin part of the sleeve. The protrusion of the mirror base being maintained sufficiently strong reduces the risk that the protrusion deforms or breaks when abutting against the stopper of the mirror head.

According to the first aspect, noise generated due to wind flowing through the gap between the mirror base and the mirror head can be reduced.

Further, by providing the second outer peripheral surface and widening the gap between the mirror head and the second outer peripheral surface, the wind flowing through the gap can be slowed down and noise generated when the wind hits parts inside the mirror head can be reduced.

According to the second aspect, the first outer peripheral surface is provided to continuously extend from the front edge of the sleeve at the front of the vehicle along the rear edge of the sleeve at the rear of the vehicle, the second outer peripheral surface is provided only on the portion of the outer peripheral surface of the sleeve outside the vehicle, and the portion of the peripheral surface of the sleeve outside the vehicle has a shorter perimeter than the portion of the peripheral surface of the sleeve inside the vehicle. This allows for reducing noise generated by wind.

According to another aspect, the sleeve has a vertical surface, which extends in the radial direction of the sleeve at the border between the first outer peripheral surface and the second outer peripheral surface. This allows for dividing the wind flowing through the gap between the mirror base and the mirror head. By reducing the concentration of the wind, noise generated by wind can be reduced.

According to still another aspect, forming the second outer peripheral surface allows for forming a part of the sleeve thin and thus for achieving weight saving.

According to yet still another aspect, allowing the stopper of the mirror head to abut against the protrusion of the mirror base from the circumferential direction allows for predetermining the range of rotation of the mirror head. Since the protrusion of the sleeve is then at a distance from the second outer peripheral surface in the circumferential direction, the portion on which the protrusion is formed is separated from the thin part of the sleeve and the protrusion can be maintained sufficiently strong. This reduces the risk that the protrusion deforms or breaks when abutting against the stopper of the mirror head.

DETAILED DESCRIPTION

An embodiment of the present disclosure is described below in detail with reference to the drawings. Note that the below embodiment is merely a beneficial example in nature, and is not intended to limit the scope, application, or uses of the present disclosure.

Figure 1:
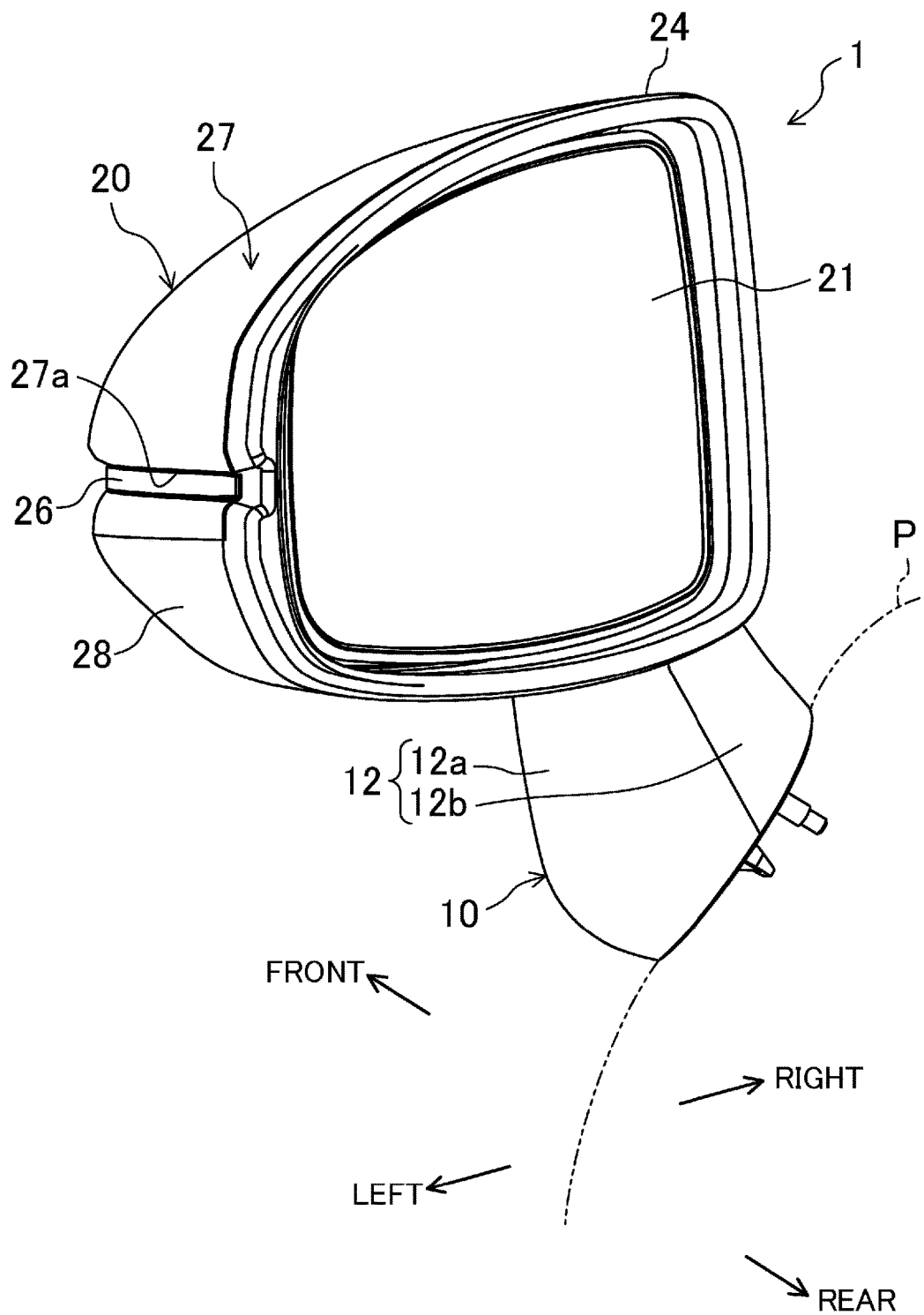
FIG. 1 is a perspective view of a vehicle side-view mirror according to an embodiment of the present disclosure when viewed from behind.

FIG. 1 shows a vehicle side-view mirror 1 according to the embodiment of the present disclosure. The vehicle side-view mirror 1 is a so-called "door mirror," which is fixed to a front edge of a door provided at a side of a vehicle, for example a car, and which is mainly used to see behind. In this embodiment, a vehicle side-view mirror 1 provided on the left side of the vehicle will be explained. Having a structure symmetrical to that of the vehicle side-view mirror 1 on the left side of the vehicle, a vehicle side-view mirror 1 provided on the right side of the vehicle will be omitted in both the drawings and the description.

The vehicle side-view mirror 1 includes a mirror base 10, and a mirror head 20. The mirror head 20 is rotatable with respect to the mirror base 10. Note that in the explanation of the embodiment, a front side of the vehicle is simply referred to as "front," a rear side as "rear," a left side as "left," and a right side as "right."

—Configuration of Mirror Base—

Figure 2:
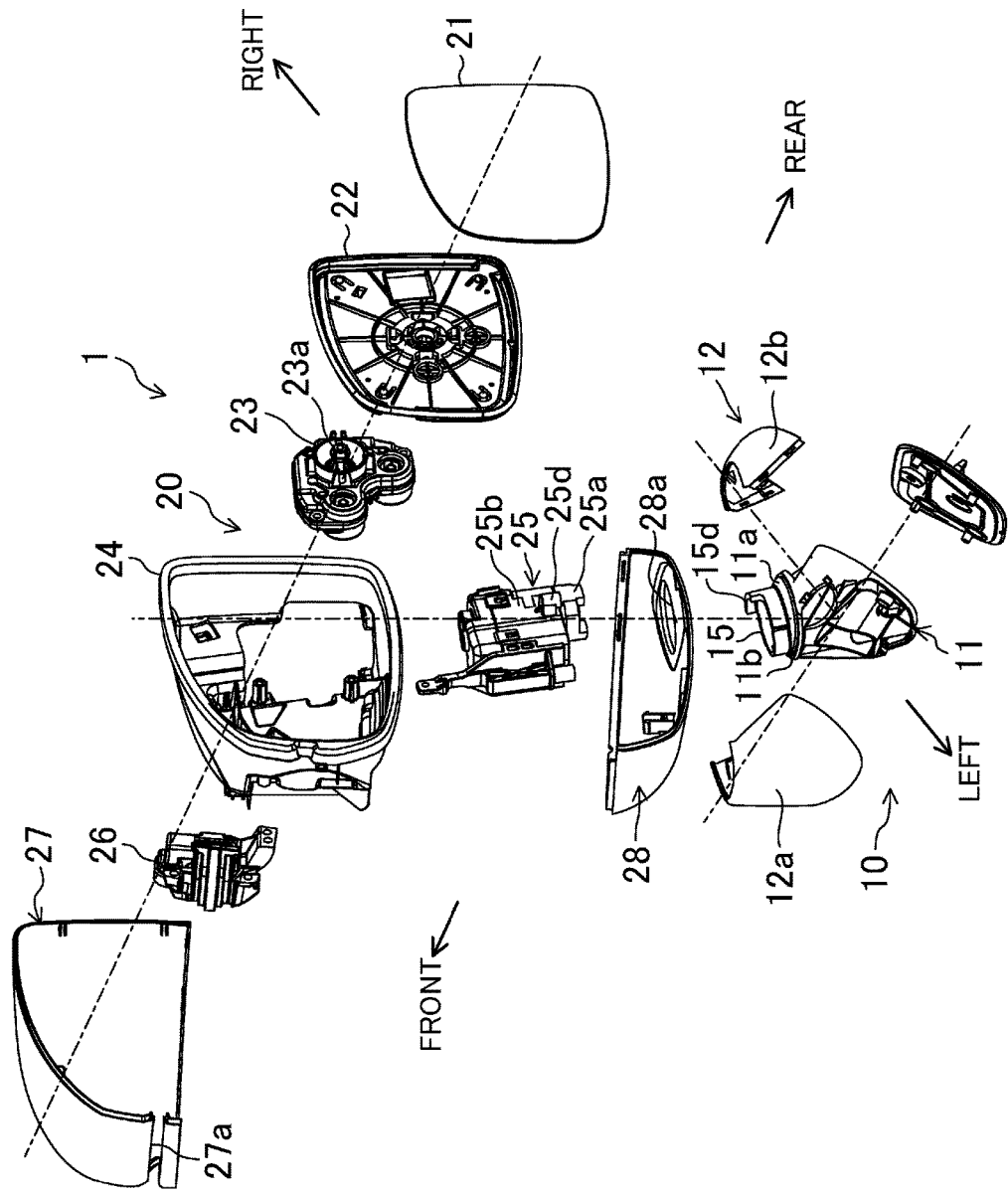
FIG. 2 is an exploded perspective view of the vehicle side-view mirror.

The mirror base 10 is fixed to an outer panel P (shown in phantom lines) of the door of a vehicle body and is provided to support the mirror head 20. As shown in FIG. 2, the mirror base 10 includes a body 11, a cover 12, and a seal 13, which is made of an elastic material. The body 11 may be made of, for example, a resin material. The body 11 has a bottom which extends along an outer surface of the outer panel P of the vehicle and is inclined so as to slope upward toward the right. The bottom of the body 11 is fixed to the outer panel P.

Figure 3:
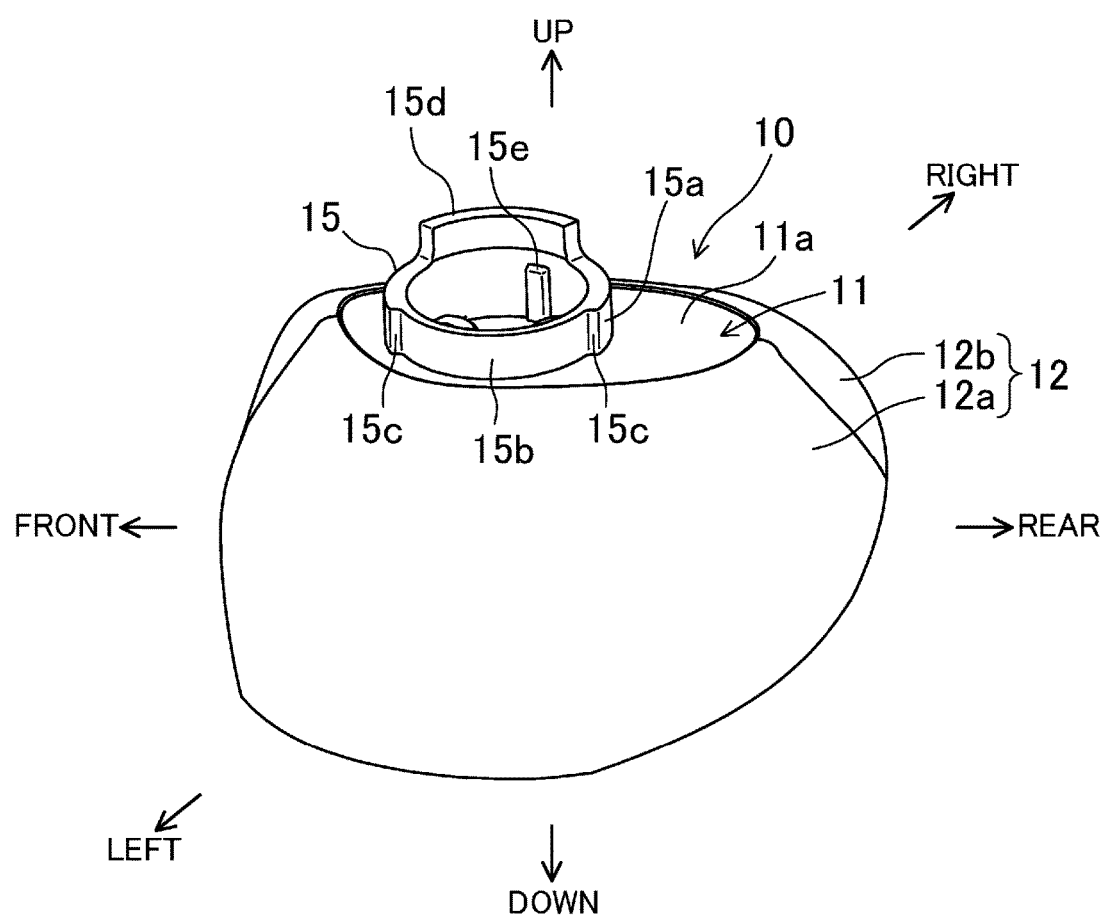
FIG. 3 is a perspective view of a mirror base when viewed from the left.
Figure 4:
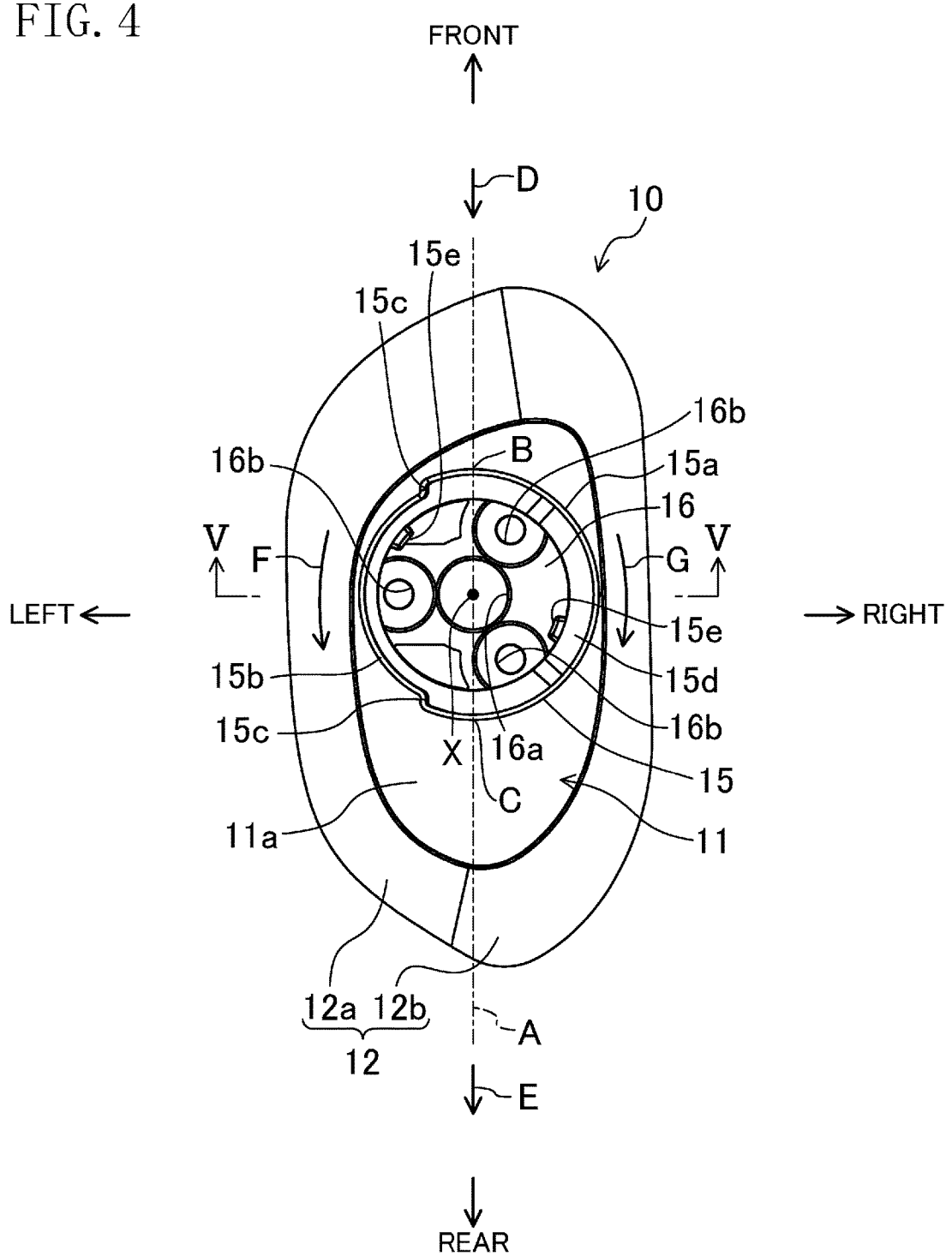
FIG. 4 is a plan view of the mirror base.

As shown in, for example, FIG. 3, the body 11 has a top with a substantially flat surface 11a. As shown in FIG. 4, the flat surface 11a is longer in a longitudinal direction than in a lateral direction. Further, the flat surface 11a has a front rim, which curves toward the front, and a rear rim, which curves toward the rear. Moreover, the flat surface 11a has left and right rims, which extend in the longitudinal direction.

Figure 5:
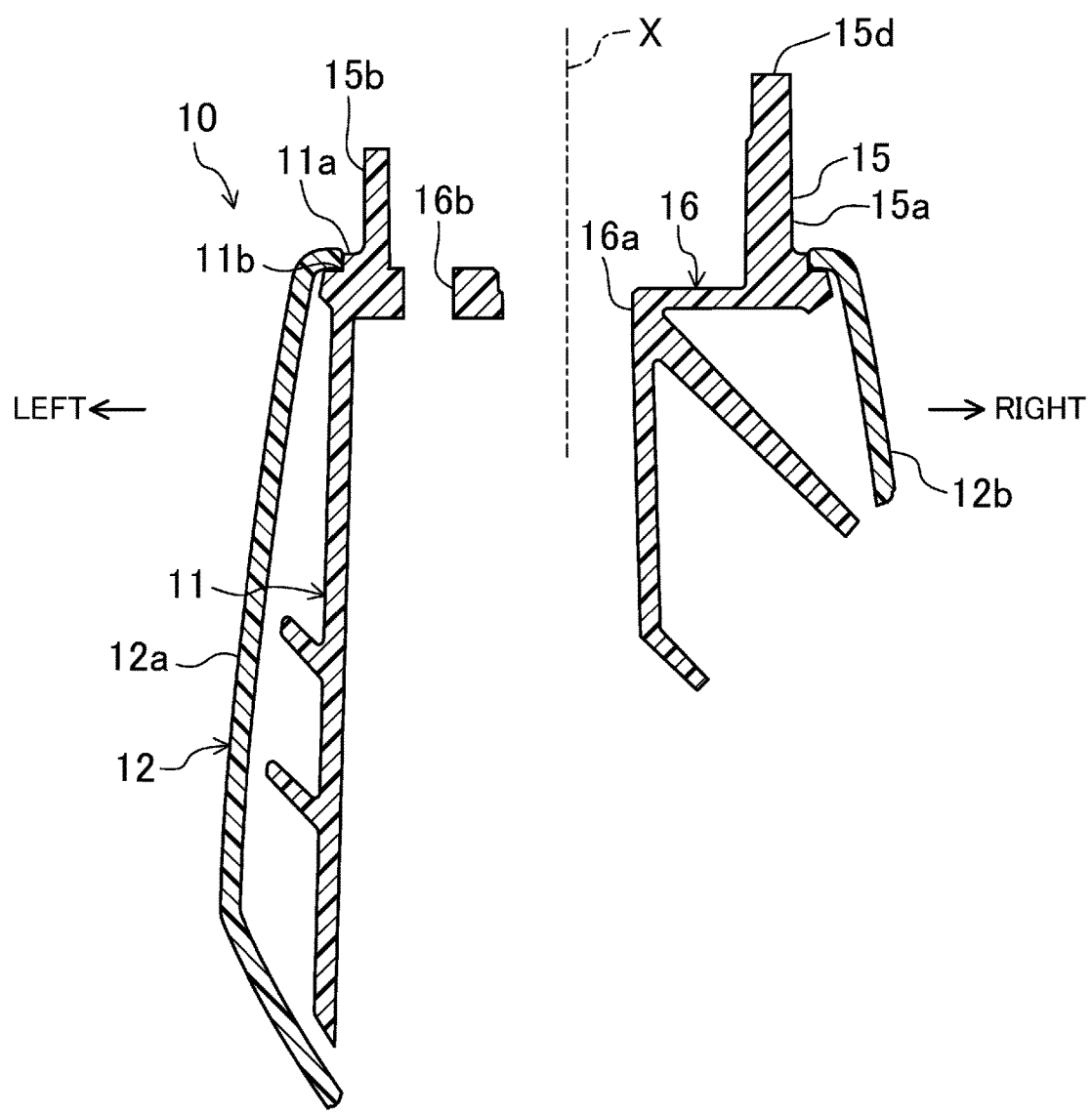
FIG. 5 is a cross-sectional view along the V-V line in FIG. 4.

As shown in FIG. 5, a step 11b, which engages with a top rim of the cover 12, is formed on a circumferential rim of the top of the body 11. The step 11b encloses an entire circumference of the flat surface 11a. A sleeve 15, which is inserted into the mirror head 20, is integrally formed on the top of the body 11. The sleeve 15 has a cylindrical shape and protrudes upward from a longitudinally and laterally intermediate section of the flat surface 11a. The sleeve 15 has an outer diameter smaller than lateral diameters of the longitudinally intermediate section of the flat surface 11a. Consequently, the flat surface 11a is disposed around the entire circumference of the sleeve 15.

As shown in FIGS. 3 and 4, the outer peripheral surface of the sleeve 15 includes a first outer peripheral surface 15a, a second outer peripheral surface 15b, and two vertical surfaces 15c and 15c. The second outer peripheral surface 15b is located further in an inward radial direction of the sleeve 15 than the first outer peripheral surface 15a. The first outer peripheral surface 15a smoothly extends in an arc-shape around an axis X of the sleeve 15 (shown in FIG. 4). The second outer peripheral surface 15b smoothly extends in an arc-shape, which has a smaller radius than the first outer peripheral surface 15a, around the axis X of the sleeve 15. The second outer peripheral surface 15b is formed on the left of the sleeve 15. Consequently, the first and second outer peripheral surfaces 15a and 15b are formed in a circumferential direction of the sleeve 15.

As shown in FIG. 4, having drawn a line A which passes through the axis X and extends in the longitudinal direction, a portion of the sleeve 15 where the line A intersects with a front of the first outer peripheral surface 15a is defined as a front edge B, whereas a portion of the sleeve 15 where the line A intersects with a rear of the first outer peripheral surface 15a is defined as a rear edge C. A portion of the outer peripheral surface of the sleeve 15 extending from the front edge B to the right toward the rear edge C is inside the vehicle. A portion of the outer peripheral surface of the sleeve 15 extending from the front edge B to the left toward the rear edge C is outside the vehicle. The portion of the outer peripheral surface of the sleeve outside the vehicle has a shorter perimeter than that inside the vehicle.

Further, an inner peripheral surface of the sleeve 15 extends so as to form a circle about the axis X when viewed from above. Consequently, the portion of the outer peripheral surface of the sleeve 15 the second outer peripheral surface 15b is formed on is thinner than that the first outer peripheral surface 15a is formed on. The vertical surfaces 15c are formed on borders between the first and second outer peripheral surfaces 15a and 15b. The vertical surfaces 15c extend in a radial direction of the sleeve 15. The vertical surfaces 15c each have a radially outward rim and a radially inward rim. Each radially outward rim is continuous with a rim in the circumferential direction on one side of the first outer peripheral surface 15a. Each radially inward rim is continuous with a rim in the circumferential direction on one side of the second outer peripheral surface 15b. Thus steps are formed on both, the front side and the rear side of the outer peripheral surface of the sleeve 15.

As shown in FIG. 3, a protrusion 15d, which protrudes upward, is formed on a part of the top of the sleeve 15 in the circumferential direction. The protrusion 15d has the shape of an arched plate which extends in the circumferential direction of the sleeve 15. The protrusion 15d has a top end, which is a flat surface extending in the circumferential direction of the sleeve 15.

In this embodiment, the second outer peripheral surface 15b is formed at a distance in the circumferential direction with respect to a portion of the sleeve 15 the second outer peripheral surface 15b is formed on. That is, the portion of the sleeve 15 the second outer peripheral surface 15b is formed on is thinner than that the first outer peripheral surface 15a is formed on. The protrusion 15d is formed on a portion other than the thin portion. This allows to maintain the protrusion 15d sufficiently strong.

Ribs 15e and 15e are formed on the inner peripheral surface of the sleeve 15. The ribs 15e and 15e extend in a vertical direction and are arranged at a distance from each other in the circumferential direction.

A bottom wall 16 is provided at a lower end inside the sleeve 15 in the body 11. A center hole 16a is formed in a center of the bottom wall 16 (on top of the axis X shown in FIG. 4) so as to penetrate the bottom wall 16 vertically. Further, three openings 16b, 16b, and 16b, which are spaced apart from each other, are formed in the vicinity of the center hole 16a of the bottom wall 16. Fasteners 100 (shown in FIG. 6) are inserted into the three openings 16b, 16b, and 16b.

The cover 12 is a surface of the mirror base 10 separate from the body 11 and designed to cover a part of the body 11. The cover 12 is made of, for example, a resin material. The cover 12 is divided into a first cover member 12a and a second cover member 12b in the radial direction of the sleeve 15. The first cover member 12a covers the left side of the body 11. The second cover member 12b covers the right side of the body 11. The first and second cover members 12a and 12b have cross-sections which widen downward. Consequently, the cover 12 has the shortest perimeter at its top rim. Further, the first and second cover members 12a and 12b are engaged with each other and attached to the body 11 via, for instance, engaging pawls (not shown). The body 11 has a bottom which is exposed from bottoms of the first and second cover members 12a and 12b.

As shown in FIGS. 3 and 4, the first and second cover members 12a and 12b each have a top rim (the top rim of the cover 12). The top rims form a circle when engaging with each other when attached to the body 11. At the same time, the top rims enclose the flat surface 11a of the body 11 of the mirror base 10. Moreover, as shown in FIG. 5, the top rims of the first and second cover members 12a and 12b of the cover 12 are bent inward and fit on the step 11b of the body 11.

Since the upper rims of the first and second cover members 12a and 12b fit on the step 11b of the body 11, the flat surface 11a of the body 11 is not covered by the cover 12 but exposed. Further, the flat surface 11a of the body 11 is arranged so as to face a bottom surface of the mirror head 20.

Furthermore, the seal 13 is provided at the bottom of the body 11 between the body 11 and the outer panel P.

—Configuration of Mirror Head—

As shown in FIG. 2, the mirror head 20 includes a mirror surface 21, a mirror holder 22, a mirror surface adjustment mechanism 23, a visor 24, a power fold mechanism 25, a turn signal light assembly 26, an upper panel 27, and a lower panel 28. The mirror 21 is connected to the mirror holder 22. The mirror surface regulating unit 23 is attached to the visor 24. The mirror holder 22 is connected to the mirror surface regulating unit 23 via a pivot 23a. Consequently, the mirror holder 22 can be tilted around the pivot 23a. The mirror surface adjustment mechanism 23 is known in the art as a mechanism for adjusting the angle of the mirror surface 21 by allowing the mirror holder 22 to be tilted around the pivot 23a.

Figure 6:
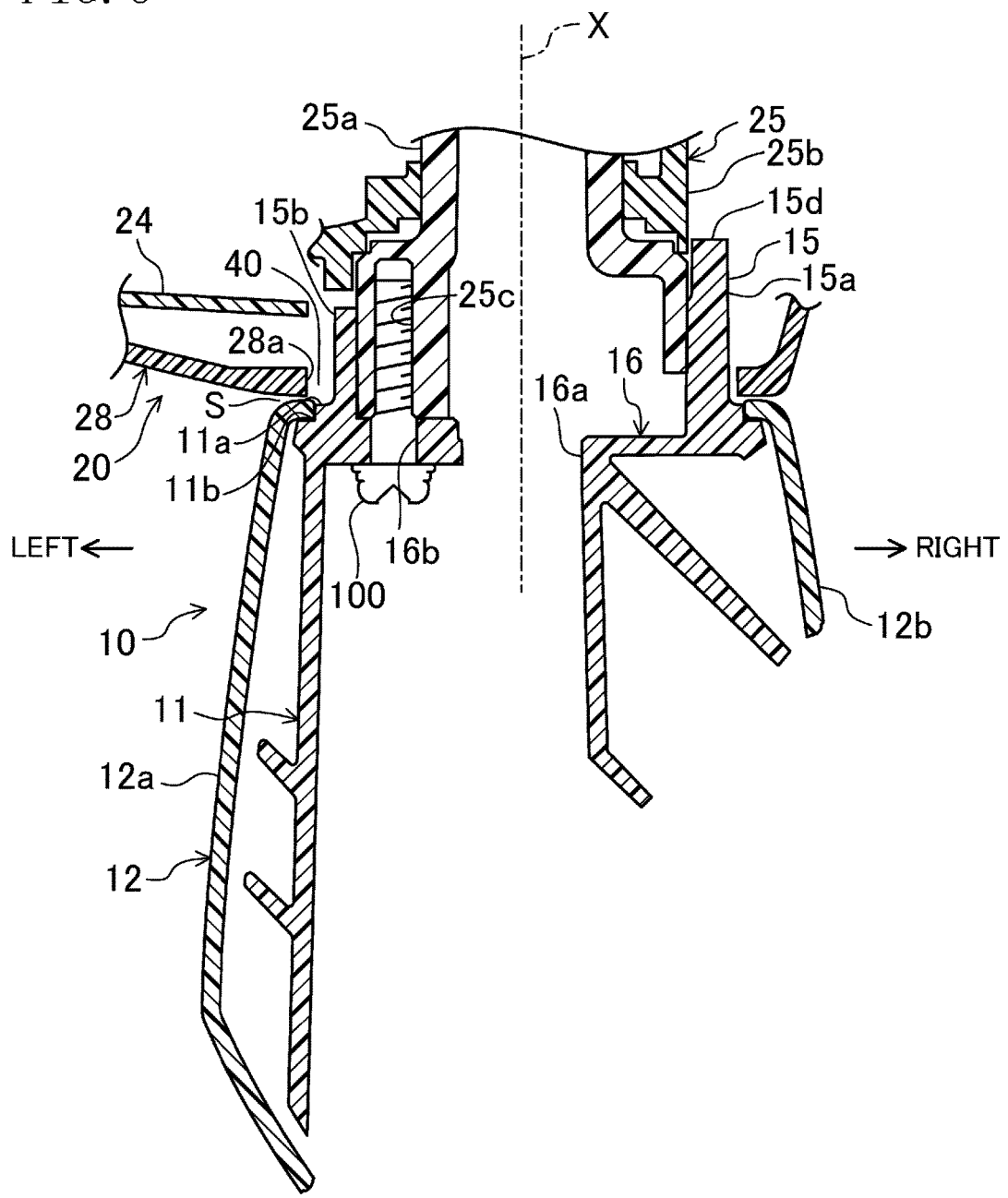
FIG. 6 is a view corresponding to that of FIG. 5 in a state where a mirror head is attached to the mirror base.

The visor 24 is a large member which can house the mirror surface 21 and the mirror holder 22, the mirror surface regulating unit 23, and the electrical storage unit 25. The power fold mechanism 25 is attached to the visor 24. The power fold mechanism 25 includes a shaft 25a and a casing 25b. The casing 25b is fixed to the visor 24, whereas the shaft 25a is fixed to the body 11 in a state where a bottom of the shaft 25a is inserted into the sleeve 15, as shown in FIG. 6. More specifically, a screw hole 25c, into which the fastener 100 is screwed, is formed in the bottom of the shaft 25a such that the screw hole 25c is open toward a bottom edge surface of the shaft 25a. The shaft 25a is fixed to the body 11 with the fastener 100, which is inserted from below into a fastener opening 16b of the body 11 of the mirror base 10, into the screw hole 25c of the shaft 25a. In a state where the shaft 25a is inserted into the sleeve 15, the bottom of the shaft 25a and the inner peripheral surface of the sleeve 15 fit together. Note that the fastener 100 may be for example a screw.

A motor, speed reducing gears and other components (not shown) are housed inside the casing 25b. Driven by the motor, the casing 25b is rotated about the shaft 25a. This makes the visor 24 rotate about the shaft 25a. Being known in the art, a detailed explanation of the structure of the power fold mechanism 25 will be omitted. Due to this rotation, the mirror head 20 is movable between a folded position and an operative position. Note that in the operative position the mirror surface 21 extends in a substantially lateral direction, as shown in FIG. 1. In the folded position, the mirror surface 21 extends in a substantially longitudinal direction (not shown).

Moreover, as shown in FIG. 2, the casing 25b is provided with a stopper 25d. When the mirror head 20 is rotated, the stopper 25d abuts against the protrusion 15d of the mirror base 10 in the circumferential direction. This allows to predetermine the range of rotation of the mirror head 20. More specifically, when the mirror head 20 is for example rotated to one side in the circumferential direction, the stopper 25d of the casing 25b is also rotated and abuts against the protrusion 15d of the mirror base 10 from the one side in the circumferential direction. As a result, the range of rotation is limited. When the mirror head 20 is rotated to the other side in the circumferential direction, the stopper 25d abuts against the protrusion 15d of the mirror base 10 from the other side in the circumferential direction. As a result, the range of rotation is limited.

When the stopper 25d abuts against the protrusion 15d of the mirror base 10, the entire rotational energy of the power fold mechanism 25 hits the protrusion 15d. In this embodiment, however, the protrusion 15d is formed on a thick portion of the sleeve 15, which reduces the risk that the protrusion 15d deforms or breaks.

The turn signal light assembly 26 is a direction indicator known in the art provided in front of the visor 24. The upper panel 27 covers a top front of the visor 24. A notch 27a, which exposes a part of the turn signal light assembly 26, is formed in the upper panel 27.

The lower panel 28 covers a bottom front of the visor 24. The lower panel 28 has a bottom which extends to and covers a bottom of the visor 24. The opening 28a, into which the sleeve 15 of the mirror base 10 is inserted, is formed in the bottom of the lower panel 28. As shown in FIG. 6, in a state where the mirror head 20 is fixed to the mirror base 10, the sleeve 15 of the mirror base 10 is inserted into the opening 28a and a gap S is formed between the cover 12 of the mirror base 10 and the bottom of the lower panel 28 of the mirror head 20.

The opening 28a of the lower panel 28 has a substantially circular shape with the axis X of the sleeve 15 in its center and an inner diameter larger than an outer diameter of the sleeve 15 of the mirror base 10. Thus, when the sleeve 15 of the mirror base 10 is inserted into the opening 28a, a space, which allows air to pass, is formed between the sleeve 15 and the opening 28a.

Since the second outer peripheral surface 15b of the sleeve 15 of the mirror base 10 is located further in the inward radial direction of the sleeve 15 than the first outer peripheral surface 15a, a passage 40 is formed between the second outer peripheral surface 15b and the inner peripheral surface of the opening 28a. The passage 40 guides wind, which has flown into the gap S, into the mirror head 20. More specifically, the passage 40 has the shape of a curved slit corresponding to a region the second outer peripheral surface 15b is formed in and communicates with the gap S and an interior of the mirror head 20. Thus, when crosswind, which flows for example from the left to the right, hits the vehicle side-view mirror, the crosswind flows through the gap S and the passage 40 and then into the mirror head 20.

Moreover, edges of main parts such as the power fold mechanism 25 and the visor 24 are disposed further outside the vehicle (on the left) than the axis X of the sleeve 15. More specifically, wind, which flows into the visor 24 and hits parts disposed inside the visor 24, is prone to cause wind noise. In this embodiment, however, the speed of wind flowing along the peripheral surface of the sleeve 15 further outside the vehicle than the axis X, where edges of the visor 24 and other main parts are disposed, is effectively reduced. This allows to slow down the speed of wind flowing into the gap between the mirror head 20 and the sleeve 15 and to reduce noise generated when wind hits the edges of the visor 24 and other main parts.

Note that, since the edges of the visor 24 and other main parts not are disposed inside the vehicle, hardly any wind noise is produced inside the vehicle even if the speed of wind flowing along the peripheral surface of the sleeve 15 further inside the vehicle than the axis X is not reduced.

—Advantages of Embodiment—

Next, advantages of the embodiment will be described. When the mirror head 20 is fixed to the mirror base 10, the sleeve 15 of the mirror base 10 is inserted into the opening 28a. Since in this state the second outer peripheral surface 15b of the sleeve 15 is located further in the inward radial direction than the first outer peripheral surface 15a, the passage 40 of a sufficiently large cross-section, which is larger than that of the gap S, is formed between the second outer peripheral surface 15b and the inner peripheral surface of the opening 28a.

Moreover, since the second outer peripheral surface 15b, which is a part of an inner surface of the passage 40, extends smoothly, turbulences become less likely to form in the vicinity of the gap S. By this, noise generated due to wind flowing through the gap S between the mirror base 10 and the mirror head 20 can be reduced.

Moreover, at the front edge B of the sleeve 15, headwind (indicated by the arrow D in FIG. 4) flowing from the front of the vehicle is divided into two wind flows. One wind flow (indicated by the arrow G in FIG. 4) flows along the peripheral surface of the sleeve 15 inside the vehicle and the other wind flow (indicated by the arrow F in FIG. 4) flows along the peripheral surface of the sleeve 15 outside the vehicle. At the rear edge C of the sleeve 15, these wind flows merge again (indicated by the arrow E in FIG. 4) and flow toward the rear of the vehicle. The two wind flows G and F have the same wind speed at the front edge B and at the rear edge C of the sleeve 15. Between the front edge B and the rear edge C, however, the wind flow F flowing along the peripheral surface of the sleeve 15 outside the vehicle, which has a shorter perimeter, has a relatively lower wind speed than the wind flow G flowing along the peripheral surface of the sleeve 15 inside the vehicle, which has a longer perimeter. Consequently, as described above, the peripheral surfaces of the sleeve 15 inside and outside the vehicle have different perimeters so that the wind speed of the wind flow F flowing along the peripheral surface of the sleeve 15 outside the vehicle can be effectively reduced.

Moreover, the vertical surfaces 15c and 15c of the sleeve 15 guide crosswind, which flows into the gap S between the mirror base 10 and the mirror head 20, also in the radially outward direction of the sleeve 15. This divides the crosswind into a wind flow flowing into the mirror head 10 and a wind flow flowing in a radial direction of the sleeve 15. Thus, noise can be reduced.

Further, the second outer peripheral surface 15b of the sleeve 15 is located further in the inward radial direction than the first outer peripheral surface 15a. Forming the second outer peripheral surface 15b allows for forming a part of the sleeve 15 thin and thus for achieving weight saving.

Moreover, when the mirror head 20 is rotated, the stopper 25d of the mirror head 20 abuts against the protrusion 15d of the sleeve 15 of the mirror base 10 in a circumferential direction. This allows for defining the range of rotation of the mirror head 20 as a predetermined range. Since the protrusion 15d is then at a distance from the second outer peripheral surface 15b in the circumferential direction, the portion the protrusion 15d is formed on is separated from the thin part of the sleeve 15. Since the protrusion 15d of the mirror base 10 is maintained sufficiently strong, the risk that the protrusion 15d deforms or breaks when abutting against the stopper 25d of the mirror head 20 is reduced.

Further, the flat surface 11a of the body 11 of the mirror base 10 is arranged so as to face the bottom surface of the mirror head 20 and is exposed from the cover 12. The sleeve 15 is formed integrally with the top of the body 11. In this way, no gap is formed between the sleeve 15 and the cover 12. Thus, noise generated by wind flowing through the gap S between the mirror base 10 and the mirror head 20 can be reduced.

Moreover, since the top rims of the first and second cover members 12a and 12b of the mirror base 10 fit on the step 11b of the body 11, the cover 12 is securely fixed to the body 11 of the mirror base 10. Thus, there is hardly any space between the cover 12 and the body 11 through which wind could enter.

Further, the flat surface 11a of the body 11 of the mirror base 10 extends in the longitudinal direction. Therefore, when wind, which flows from the front toward the rear while the vehicle is in motion, enters the gap S between the mirror base 10 and the mirror head 20, the wind flows smoothly along the top of the body 11 toward the rear. This may reduce wind noise.

Furthermore, by providing the second outer peripheral surface 15b and widening the gap S between the mirror head 10 and the second outer peripheral surface 15b, the wind flowing through the gap S can be slowed down and noise generated when the wind hits parts inside the mirror head 20 (wind interaction) can be reduced.

The above embodiment is a mere example in all respects, and should not be limited in interpretation. In addition, all modifications and variations within the range of equivalents of the claims fall within the range of the present disclosure.

As can be seen from the above description, the vehicle side-view mirror according to the present disclosure may be provided at a side of, for example, a car.

What is claimed is:

1. A vehicle side-view mirror comprising:
   a mirror base, which is fixed to a vehicle body; and
   a mirror head, which includes a mirror surface, is attached to the mirror base to be rotatable about an axis vertically extending with respect to the mirror base, and is switchable between a folded position and an operative position, wherein
   a gap is formed between the mirror base and the mirror head,
   a sleeve, which protrudes upward, is formed on the mirror base,
   an opening, into which the sleeve is inserted, is formed in a bottom of the mirror head,
   the sleeve has an outer peripheral surface on which a first outer peripheral surface and a second outer peripheral surface, which is located further in an inward radial direction of the sleeve than the first outer peripheral surface, are formed in a circumferential direction,
   the second outer peripheral surface is formed so as to extend smoothly in the circumferential direction of the sleeve, and
   a passage, which guides wind entering the gap into the mirror head, is formed between the second outer peripheral surface and an inner peripheral surface of the opening.

2. A vehicle side-view mirror comprising:
   a mirror base, which is fixed to a vehicle body; and
   a mirror head, which includes a mirror surface, is attached to the mirror base to be rotatable about an axis vertically extending with respect to the mirror base, and is switchable between a folded position and an operative position, wherein a gap is formed between the mirror base and the mirror head, a sleeve, which protrudes upward, is formed on the mirror base, an opening, into which the sleeve is inserted, is formed in a bottom of the mirror head, the sleeve has an outer peripheral surface on which a first outer peripheral surface and a second outer peripheral surface, which is located further in an inward radial direction of the sleeve than the first outer peripheral surface, are formed in a circumferential direction, the first outer peripheral surface is provided inside the vehicle to continuously extend from a front edge of the sleeve at a front of the vehicle along a rear edge of the sleeve at a rear of the vehicle, the second outer peripheral surface is provided only on a portion of the outer peripheral surface of the sleeve outside the vehicle, and the portion of the peripheral surface of the sleeve outside the vehicle has a shorter perimeter than the portion of the peripheral surface of the sleeve inside the vehicle.

3. The vehicle side-view mirror of claim 1, wherein
the outer peripheral surface of the sleeve has a vertical surface, which extends in a radial direction of the sleeve at a border between the first outer peripheral surface and the second outer peripheral surface.

4. The vehicle side-view mirror of claim 2, wherein
the outer peripheral surface of the sleeve has a vertical surface, which extends in a radial direction of the sleeve at a border between the first outer peripheral surface and the second outer peripheral surface.

5. The vehicle side-view mirror of claim 1, wherein
a portion of the sleeve the second outer peripheral surface is formed on is thinner than a portion of the sleeve the first outer peripheral surface is formed on.

6. The vehicle side-view mirror of claim 2, wherein
a portion of the sleeve the second outer peripheral surface is formed on is thinner than a portion of the sleeve the first outer peripheral surface is formed on.

7. The vehicle side-view mirror of claim 5, wherein
a protrusion, which protrudes upward, is provided on a portion of a top of the sleeve in the circumferential direction, the mirror head is provided with a stopper, which abuts against the protrusion from the circumferential direction when the mirror head is rotated, the stopper setting a range of rotation of the mirror head, and the second outer peripheral surface is formed at a distance in the circumferential direction with respect to the portion of the sleeve the protrusion is formed on.

8. The vehicle side-view mirror of claim 6, wherein
a protrusion, which protrudes upward, is provided on a portion of a top of the sleeve in the circumferential direction, the mirror head is provided with a stopper, which abuts against the protrusion from the circumferential direction when the mirror head is rotated, the stopper setting a range of rotation of the mirror head, and the second outer peripheral surface is formed at a distance in the circumferential direction with respect to the portion of the sleeve the protrusion is formed on.

9. The vehicle side-view mirror of claim 3, wherein
a portion of the sleeve the second outer peripheral surface is formed on is thinner than a portion of the sleeve the first outer peripheral surface is formed on.

10. The vehicle side-view mirror of claim 4, wherein
a portion of the sleeve the second outer peripheral surface is formed on is thinner than a portion of the sleeve the first outer peripheral surface is formed on.

* * * * *